Figure 1:
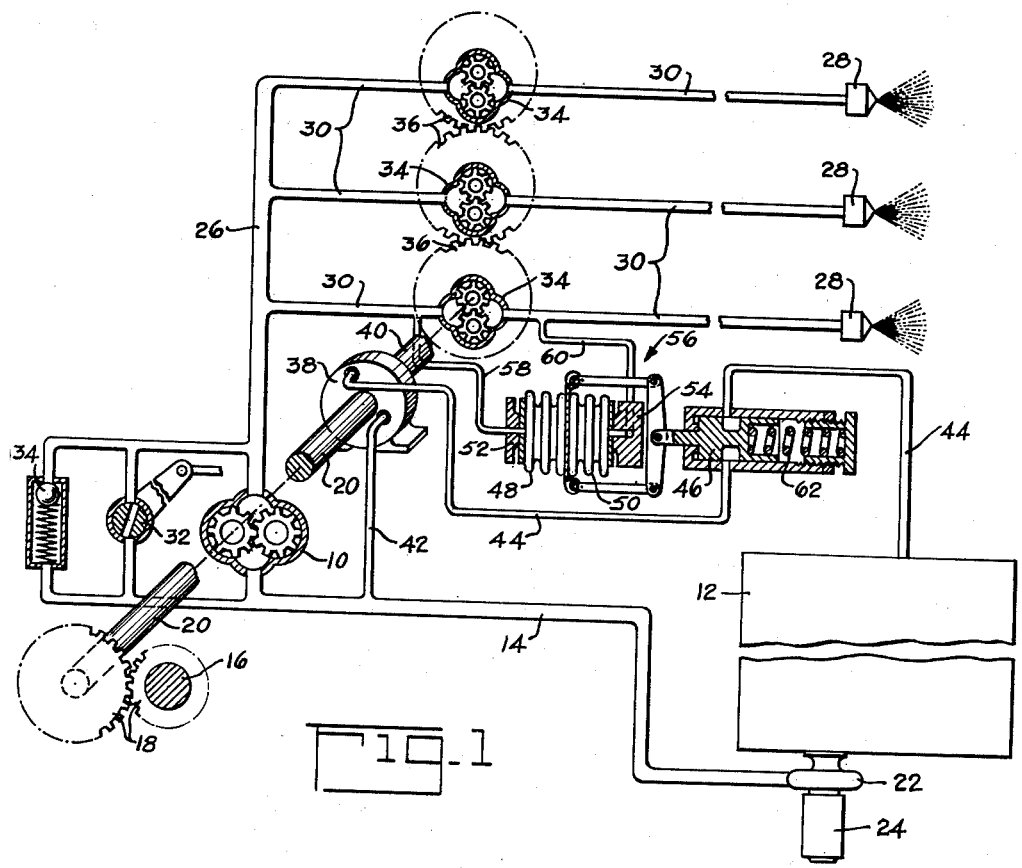

June 10, 1952 — W. L. WEEKS — 2,599,680
LIQUID DISTRIBUTING SYSTEM
Filed Aug. 26, 1947

INVENTOR
WALTER L. WEEKS.
BY Victor D. Behn
ATTORNEY

Patented June 10, 1952

2,599,680

UNITED STATES PATENT OFFICE 2,599,680

LIQUID DISTRIBUTING SYSTEM

Walter L. Weeks, Wyckoff, N. J., assignor to Curtiss-Wright Corporation, a corporation of Delaware Application August 26, 1947, Serial No. 770,737

12 Claims. (Cl. 299—58)

This invention relates to liquid distributing means and is particularly directed to such means providing for a predetermined division of liquid flow through a plurality of flow passages.

An object of this invention comprises the provision of a liquid distributing system in which means are provided for insuring proportionate or equal flow through a plurality of liquid flow passages. The invention has been designed for use in connection with a gas turbine engine for controlling the relative rates of fuel flow from the engine fuel nozzles. In such an engine, fuel is generally supplied to its combustion chamber or chambers through a plurality of fuel nozzles. In accordance with the present invention, means are provided to maintain substantially equal rates of fuel flow through said fuel nozzles in order to obtain most efficient combustion. As will appear, however, the invention is not limited to this specific application and instead the invention may be used for providing any desired division of liquid flow through a plurality of passages.

Figure 2:
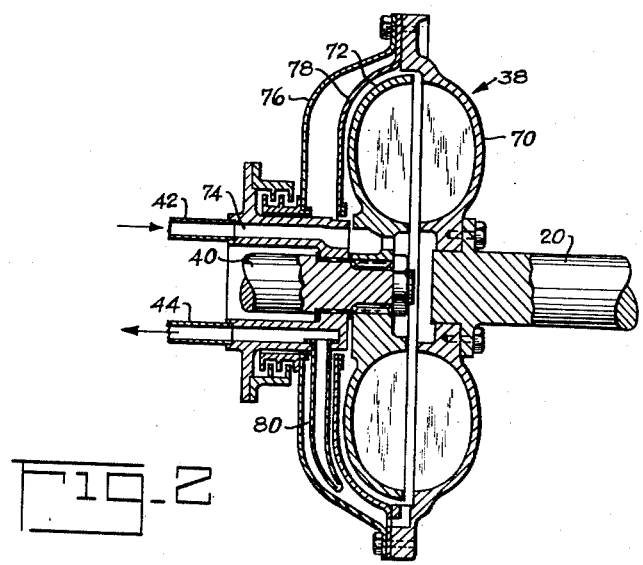

Other objects of the invention will become apparent upon reading the annexed detailed description in connection with the drawing in which:

Figure 1 is a diagrammatic view illustrating a liquid distributing system embodying the invention; and Figure 2 is a sectional view of the hydraulic coupling illustrated in Figure 1.

Referring to the drawing, fuel is supplied to a positive displacement gear type pump 10 from a tank 12 through a conduit 14. The pump 10 is adapted to be driven from a turbine driven shaft 16 via gears 18 and a shaft 20. The shaft 16 may be the main or output shaft of the turbine or it may comprise an auxiliary shaft driven by the turbine. In order to insure a supply of fuel to the inlet of the engine driven pump 10, a booster pump 22 may be provided at the tank 12. As illustrated the booster pump 22 is arranged to be driven by an electric motor 24 and is disposed at the outlet end of the fuel tank 12 for pumping fuel from said tank to the main pump 10. Preferably the booster pump 22 is a type—such as a centrifugal pump—which offers little or no resistance to fuel flow therethrough when the pump is not operated.

The pump 10 supplies fuel to a manifold or passage 26 from which it is distributed to a plurality of substantially similar fuel nozzles 28 through passages 30. The fuel nozzles 28 discharge fuel into the combustion chamber or chambers of a turbine. The output of the pump 10, and therefore the rate at which fuel is supplied to the nozzles 28, is controlled by a by-pass valve 32. One side of the by-pass valve 32 is connected to the inlet side of the pump 10 and the other side of said valve is connected to the outlet side of said pump. In addition a spring-loaded pressure relief valve 34 is connected around the pump 10 to limit the output pressure of said pump.

With the arrangement so far described, at any speed of the turbine the rate of fuel supply from the pump 10 to the manifold 26 and thence to the nozzles 28 may be increased by a closing adjustment of the by-pass valve 32 and vice versa. However, with this arrangement the relative rates of fuel supply from the nozzles 28 would not be exactly the same because of differences in the flow resistances of their associated passages 30, and because of small differences in the orifice coefficients and the efficiencies of the nozzles 28 resulting from manufacturing tolerances.

In order to provide for more nearly equal fuel flow from each of the nozzles 28, suitable positive-liquid-displacing devices 34 are disposed in each of the passages 30. For example and as illustrated, each said device 34 is structurally similar to a rotary gear pump or meter. As herein used a "positive-liquid-displacing" device is a device disposed in the flow path of a liquid, in which, except for leakage through the small clearances between its relatively moving parts, all the liquid flowing from the inlet to the outlet end of said device comprises liquid which is trapped within successively formed closed spaces at the inlet end of said device and is positively displaced by said closed spaces to the outlet end of said device as a result of operation or rotation of said device. Neglecting leakage losses through the clearances between relatively moving parts of each such positive-liquid-displacing devices, the rate of liquid flow therethrough is directly proportional to its speed of operation. This is true whether said device 34 is operating as a pump or whether it is being driven by the liquid flowing therethrough as a liquid meter.

The devices 34 are geared together by gears schematically indicated at 36 for rotation at equal speeds. With the arrangement so far described, the liquid fuel flowing through the passages 30 would drive their respective positive-liquid-displacing devices 34, and with these devices geared together for rotation at the same speed, the rate of fuel flow through the passages 30 would be equal except for differences in the leakage losses through said devices. The leakage of each such positive-liquid-displacing device 34, through the clearances between its relatively moving parts, is approximately proportional to the liquid pressure drop across said device. This pressure drop across each said device 34 primarily results from the power required of the liquid to drive said device. In addition a small pressure drop results from the frictional resistance to liquid flow through each device 34. In accordance with the present invention external means are provided to drive said positive liquid-displacing devices 34 such that little or no power is extracted from or is imparted to the liquid as it flows through said devices, thereby keeping the pressure difference across each said device at a small value.

As illustrated, the positive liquid displacing devices 34 are externally driven from an extension of the shaft 20, through a conventional hydraulic coupling 38 (the details of which are hereinafter described) and a shaft 40. The slip of the hydraulic coupling 38 (the details of which are hereinafter described) and a shaft 40. The slip of the hydraulic coupling 38 is controlled so that each positive-liquid-displacing device 34 is driven by said coupling at a speed which closely corresponds to the fuel flow rate through its passage 30 whereby the pressure difference across each said device is kept at a minimum value. For this purpose, the hydraulic coupling 38 must be driven from the shaft 20 at a speed such that for maximum fuel flow to the manifold 26 and through the passages 30, the hydraulic coupling is capable of driving the devices 34 approximately at the speed corresponding to the maximum rate of fuel flow through said devices. Then as the fuel flow is reduced, the slip of the hydraulic coupling is correspondingly increased.

The working fluid of the hydraulic coupling 38 is liquid fuel supplied thereto through the conduit 14 and a conduit 42. The coupling is also provided with a return conduit 44 into which fuel escapes and is returned to the tank 12 from the coupling. A valve 46 is disposed in the return conduit 44 whereby closing movement of the valve 46 reduces the rate at which fuel can escape from the coupling 38 relative to the rate at which fuel is supplied thereto, thereby increasing the quantity of fuel within the coupling so as to decrease its slip. Similarly an opening adjustment of the valve 46 increases the rate at which liquid fuel escapes from the coupling relative to the rate at which liquid fuel is supplied to the coupling whereupon the slip of the coupling increases.

The valve 46 is controlled by a pair of bellows 48 and 50 mounted between fixed abutments 52 and 54. The facing ends of said bellows are connected to the valve 46 through a suitable system of links 56. The interior of the bellows 48 and 50 is connected to opposite sides of one of the devices 34 by conduits 58 and 60 respectively such that an increase in the pressure drop across said one device 34 urges the valve 46 to the right (Figure 1) to effect a closing adjustment of the return passage 44. The force exerted by the bellows 48 and 50 urging the valve 46 in a closing direction is resisted by a compression spring 62. With this arrangement the slip of the hydraulic coupling 38 is automatically adjusted by the valve 46 so that the pressure difference across one of the positive displacing devices 34 is at a predetermined minimum value determined by the adjustment of a spring 62. Preferably, the spring 62 is set so that the pressure drop measured by the bellows 48 and 50 is approximately equal to the small pressure drop resulting from the frictional resistance offered by the associated device 34 to flow therethrough. The devices 34 are substantially similar so that the pressure drop across all said devices is automatically maintained substantially at said minimum value. As a result, leakage of fuel between the relatively moving parts of each device 34 is very small whereby the difference between the rates of fuel flow through any two passages 30, resulting from difference in said leakages, becomes negligible.

With the system described, the output power of the hydraulic coupling 38 is automatically maintained substantially at the value required to drive the positive-liquid-displacing devices 34 at the speed corresponding to the rate of fuel flow through said devices. This automatic operation takes place both when the rate of fuel flow is varied at a given engine speed and when the engine speed is varied at a given rate of fuel flow. Accordingly the hydraulic coupling 38 constitutes an external drive for each positive-liquid-displacing device 34 such that substantially all the power for driving said device is furnished from said coupling whereby the pressure difference across said device is maintained at a small value.

At this point it should be clear that the positive-liquid-displacing devices 34 may be driven by any suitable external means, that is by any means other than directly by the liquid flowing therethrough such that the power output of said external means varies approximately with the rate at which fuel flows through said devices. Also by varying the capacity and/or speed of one or more of the devices 34 relative to the other, any desired division of liquid flow between the passages 30 may be obtained.

The hydraulic coupling 38, schematically illustrated in Figure 1 is conventional. The primary details of a suitable hydraulic coupling are illustrated in Figure 2. As illustrated in Figure 2 the shaft 20 is suitably secured to the impeller 70 of the hydraulic coupling 38 while the runner 72 of said coupling is secured to the shaft 40. The hydraulic coupling inlet conduit 42 communicates with a passage 74 through which liquid fuel is supplied to the working chamber of the hydraulic coupling between its impeller 70 and runner 72. Fuel escapes from said coupling working chamber through the annular opening disposed between the outer peripheries of said impeller and runner under the action of the centrifugal forces acting on said fuel. A pair of spaced housing walls 76 and 78 is secured to the impeller and a scoop 80, carried by the fixed coupling supporting structure, extends between said housing walls. The scoop 80 communicates with the return conduit 44. With this construction, a closing adjustment of the valve 46 (Figure 1) in the return conduit 44 increases the quantity of liquid within the coupling working chamber thereby decreasing its slip and vice versa. Obviously the invention is not limited to this specific coupling construction.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:
1. A liquid distributing system comprising a manifold; a plurality of discharge nozzles arranged to discharge into regions of substantially the same pressure; a plurality of passageways, one for each nozzle, for supplying liquid from said manifold to said nozzles; a plurality of similar positive-liquid-displacing rotary devices, one in each of said passageways; means gearing said devices together to insure their rotation at the same speed; means external to said devices and drivably connected thereto; means for automatically controlling the power output of said external means such that an increase in the pressure difference across one of said devices results in a change in said power output so as to reduce said pressure difference; and means for varying the rate of liquid flow into said manifold.

2. A liquid distributing system comprising a manifold; a plurality of discharge nozzles arranged to discharge into regions of substantially the same pressure; a plurality of passageways, one for each nozzle, for supplying liquid from said manifold to said nozzles; a plurality of similar positive-liquid-displacing rotary devices, one in each of said passageways; means gearing said devices together to insure their rotation at the same speed; a hydraulic coupling drivably connected to said devices; and means responsive to an increase in the pressure difference across one of said devices for controlling the slip of said hydraulic coupling so as to reduce said pressure difference.

3. A liquid distributing system comprising a manifold; a plurality of discharge nozzles arranged to discharge into regions of substantially the same pressure; a plurality of passageways, one for each nozzle, for supplying liquid from said manifold to said nozzles; a plurality of similar-positive-liquid-displacing rotary devices, one in each of said passageways; means gearing said devices together to insure their rotation at the same speed; a hydraulic coupling drivably connected to said devices; means for automatically controlling the slip of said hydraulic coupling such that an increase in the pressure difference across one of said devices results in a change in said slip so as to reduce said pressure difference; and means for varying the rate of liquid flow into said manifold.

4. A liquid distributing system comprising a manifold; a plurality of discharge nozzles arranged to discharge into regions of substantially the same pressure; a plurality of passageways, one for each nozzle, for supplying liquid from said manifold to said nozzles; a plurality of similar positive-liquid-displacing rotary devices, one in each of said passageways; means gearing said devices together to insure their rotation at the same speed; a hydraulic coupling drivably connected to said devices; and means responsive to the pressure difference across one of said devices for controlling the slip of said hydraulic coupling such that an increase in said pressure difference results in a decrease in said slip and vice versa.

5. A liquid distributing system comprising a source of liquid; a manifold; means for supplying a liquid under pressure from said source to said manifold; a plurality of discharge nozzles arranged to discharge into regions of substantially the same pressure; a plurality of passageways, one for each nozzle, for supplying liquid from said manifold to said nozzles; a plurality of similar positive-liquid-displacing rotary devices, one in each of said passageways; means gearing said devices together to insure their rotation at the same speed; a hydraulic coupling drivably connected to said devices; means to supply working liquid to said coupling from said source; means responsive to an increase in the pressure difference across one of said devices for controlling the slip of said coupling so as to reduce said pressure difference; and means for controlling the rate of liquid flow into said manifold.

6. A liquid distributing system comprising a source of liquid; a manifold; means for supplying a liquid under pressure from said source to said manifold; a plurality of discharge nozzles arranged to discharge into regions of substantially the same pressure; a plurality of passageways, one for each nozzle, for supplying liquid from said manifold to said nozzles; a plurality of similar positive-liquid-displacing rotary devices, one in each of said passageways; means gearing said devices together to insure their rotation at the same speed; means external to said devices and having an output shaft drivably connected to said devices; said external means including liquid from said source for imparting power to its said output shaft; means responsive to a condition indicative of the liquid pressure difference across at least one of said devices; and means controlled by said responsive means upon an increase in said pressure difference for varying the power transmitted by said power means so as to reduce said pressure difference.

7. A liquid distributing system comprising a plurality of nozzles arranged to discharge into regions of substantially the same pressure; a plurality of passageways, one for each of said nozzles; means for supplying liquid from a common source to said passageways for distribution therethrough to said nozzles; a plurality of similar positive-liquid-displacing rotary devices, one in each of said passageways, each said device comprising a pair of meshing gears arranged, upon their rotation, to transport liquid from the inlet to the outlet of said device; means connecting said devices together to insure their rotation at the same speed; a source of power external to said devices and drivably connected thereto; means adjustable for varying the power delivered from said source to said devices; and means for automatically operating said adjustable means such that an increase in the liquid pressure difference across at least one of said devices results in a change in the power delivered to said devices so as to reduce said pressure difference.

8. A liquid distributing system comprising a plurality of nozzles arranged to discharge into regions of substantially the same pressure; a plurality of passageways, one for each of said nozzles; means for supplying liquid from a common source to said passageways for distribution therethrough to said nozzles; a plurality of similar positive-liquid-displacing rotary devices, one in each of said passageways, each said device comprising a pair of meshing gears arranged upon their rotation, to transport liquid from the inlet to the outlet of said device; means connecting said devices together to insure their rotation at the same speed; a source of power; a slip coupling drivably connecting said source of power to said devices; and means for automatically decreasing the slip of said coupling in response to an increase in the liquid pressure difference across at least one of said devices.

9. A liquid distributing system comprising a plurality of discharge nozzles arranged to discharge into regions of substantially the same pressure; a plurality of passageways, one for each of said nozzles; a pump for supplying liquid to said passageways for distribution therethrough to said discharge nozzles; a plurality of similar positive-liquid-displacing devices, one for each of said passageways; means interconnecting said devices to insure their operation at the same speed; power means external to said devices and drivably connected thereto; means responsive to a condition indicative of the liquid pressure difference across at least one of said devices; and means automatically controlled by said responsive means upon an increase in said pressure difference for varying the power transmitted by said power means so as to reduce said pressure difference.

10. A liquid distributing system comprising a plurality of discharge nozzles arranged to discharge into regions of substantially the same pressure; a plurality of passageways, one for each of said nozzles; a pump for supplying liquid to said passageways for distribution therethrough to said discharge nozzles; a plurality of similar positive-liquid-displacing rotary devices, one for each of said passageways; means gearing said devices together for rotation at the same speed; power means external to said devices and drivably connected thereto; means responsive to a condition indicative of the liquid pressure difference across at least one of said devices; and means automatically controlled by said responsive means upon an increase in said pressure difference for varying the power transmitted by said power means so as to reduce said pressure difference.

11. A liquid distributing system comprising a plurality of discharge nozzles arranged to discharge into regions of substantially the same pressure; a plurality of passageways; one for each of said nozzles; a pump for supplying liquid to said passageways for distribution therethrough to said discharge nozzles; a plurality of similar positive-liquid-displacing devices, one for each of said passageways; and mechanism for maintaining the liquid pressure difference across each of said devices below what said pressure would be in the absence of said mechanism, said mechanism including power means external to said devices and drivably connected thereto, means responsive to a condition such that changes in said condition result from changes in the rate of liquid flow through said devices, and means automatically controlled by said responsive means for varying the power transmitted by said power means to said devices so that said power increases and decreases with increase and decrease, respectively, in the rate of liquid flow through said devices.

12. A liquid distributing system comprising a plurality of discharge nozzles arranged to discharge into regions of substantially the same pressure; a plurality of passageways, one for each of said nozzles; a pump for supplying liquid to said passageways for distribution therethrough to said discharge nozzles; a plurality of similar positive-liquid displacing rotary devices, one for each of said passageways; means gearing said devices together for rotation at the same speed; and mechanism for maintaining the liquid pressure difference across each of said devices below what it would be in the absence of said mechanism, said mechanism including power means external to said devices and drivably connected thereto, means responsive to a condition such that changes in said condition result from changes in the rate of liquid flow through said devices, and means automatically controlled by said responsive means for varying the power transmitted by said power means to said devices so that said power increases and decreases with increase and decrease, respectively, in the rate of liquid flow through said devices.

WALTER L. WEEKS.

REFERENCES CITED

The following references are of record in the file of this patent:

UNITED STATES PATENTS

| Number | Name | Date |
|---|---|---|
| 2,185,144 | Edwards | Dec. 26, 1939 |
| 2,360,526 | Staples | Oct. 17, 1944 |